(12) United States Patent
Taborisskiy et al.

(10) Patent No.: US 7,750,821 B1
(45) Date of Patent: Jul. 6, 2010

(54) SYSTEM AND METHOD FOR INSTRUMENT PANEL WITH COLOR GRAPHICAL DISPLAY

(75) Inventors: Yuriy Taborisskiy, West Bloomfield, MI (US); Igor Klimchynski, Ann Arbor, MI (US); Michael R. Boyd, Saline, MI (US)

(73) Assignee: Yazaki North America, Inc., Canton, MI (US)

( * ) Notice: Subject to any disclaimer, the term of this patent is extended or adjusted under 35 U.S.C. 154(b) by 651 days.

(21) Appl. No.: 11/694,579

(22) Filed: Mar. 30, 2007

(51) Int. Cl.
    *G08B 5/22* (2006.01)
(52) U.S. Cl. .................. 340/815.45; 340/461; 345/102
(58) Field of Classification Search .............. 340/815.4, 340/815.45, 815.65, 438, 459, 461; 345/87, 345/102, 30, 55, 84; 362/459, 487–489; 116/28 R, 62.4
See application file for complete search history.

(56) References Cited

U.S. PATENT DOCUMENTS

| | | |
|---|---|---|
| 2,108,342 A | 2/1938 | LeFevre |
| 2,496,488 A | 2/1950 | Ohman |
| 3,150,634 A | 9/1964 | Rosen |
| 3,389,678 A | 6/1968 | Fenwick |
| 3,490,226 A | 1/1970 | Anderson et al. |
| 3,621,811 A | 11/1971 | Hill, Jr. |
| 3,803,831 A | 4/1974 | Horzick |
| 4,409,827 A | 10/1983 | Overs |
| 4,630,895 A | 12/1986 | Abdala, Jr. et al. |
| 4,875,433 A | 10/1989 | Tsukamoto |
| 4,911,096 A | 3/1990 | Munakata |
| 5,079,470 A | 1/1992 | Kasuga et al. |
| 5,201,277 A | 4/1993 | Aoki et al. |
| 5,245,944 A | 9/1993 | Yamamoto |
| 5,257,167 A | 10/1993 | Clem |
| 6,016,038 A | 1/2000 | Mueller et al. |

(Continued)

FOREIGN PATENT DOCUMENTS

EP      0 475 281      3/1992

(Continued)

OTHER PUBLICATIONS

Stitch, Andreas. "LEDs, New Light Sources for Display Backlighting," Feb. 2, 2004, pp. 1-9.

(Continued)

*Primary Examiner*—Thomas J Mullen
(74) *Attorney, Agent, or Firm*—Harness, Dickey & Pierce, P.L.C.

(57) ABSTRACT

A message center that can comprise a liquid crystal display (LCD) is provided. The LCD can be divided into one or more zones, with each zone being designated for a specific message. The message center can also include a light guide system positioned behind the liquid crystal display. The light guide system can have one or more light guides, with each of the light guides having a first end, and each of the light guides can be aligned with a zone of the liquid crystal display. The message center can further include a multi-color light emitting diode (LED) that can be mounted at the first end of each of the light guides, and a control system that can set the intensity of each of the multi-colors on each of the LEDs such that a backlighting of each zone is individually controlled.

18 Claims, 5 Drawing Sheets

U.S. PATENT DOCUMENTS

| | | |
|---|---|---|
| 6,088,300 A | 7/2000 | Nakajima et al. |
| 6,150,774 A | 11/2000 | Mueller et al. |
| 6,166,496 A | 12/2000 | Lys et al. |
| 6,211,626 B1 | 4/2001 | Lys et al. |
| 6,302,522 B1 | 10/2001 | Rumph et al. |
| 6,340,868 B1 | 1/2002 | Lys et al. |
| 6,408,783 B1 | 6/2002 | Ludewig |
| 6,484,663 B2 | 11/2002 | Zech et al. |
| 6,520,654 B2 | 2/2003 | Angell et al. |
| 6,717,376 B2 | 4/2004 | Lys et al. |
| 6,754,139 B2 | 6/2004 | Herbstman et al. |
| 6,853,162 B2 | 2/2005 | Betts et al. |
| 6,864,930 B2 | 3/2005 | Matsushita et al. |
| 7,066,630 B1 | 6/2006 | Venkatram |
| 7,126,567 B2 * | 10/2006 | Nishikawa .................. 345/102 |
| 7,571,696 B1 * | 8/2009 | Fong et al. .................... 362/23 |
| 2004/0085746 A1 | 5/2004 | Chen |
| 2004/0201793 A1 | 10/2004 | Anandan et al. |
| 2005/0035940 A1 | 2/2005 | Lazaridis et al. |
| 2005/0063194 A1 | 3/2005 | Lys et al. |
| 2006/0012971 A1 | 1/2006 | Fong et al. |
| 2007/0052662 A1 * | 3/2007 | Kim et al. .................... 345/102 |
| 2007/0222741 A1 * | 9/2007 | Itaya .......................... 345/102 |
| 2007/0229451 A1 * | 10/2007 | Kusuno ...................... 345/102 |

FOREIGN PATENT DOCUMENTS

| | | |
|---|---|---|
| EP | 0 562 332 | 3/1993 |
| JP | 01260391 | 10/1989 |
| JP | 02174570 | 7/1990 |
| JP | 03200072 | 9/1991 |
| JP | 06230158 | 8/1994 |
| JP | 06230159 | 8/1994 |

OTHER PUBLICATIONS

U.S. Appl. No. 11/765,249, filed Jun. 19, 2007, Ching Fong et al.
U.S. Appl. No. 11/157,013, filed Jun. 20, 2005, Ching Fong et al.
U.S. Appl. No. 11/171,703, filed Jun. 30, 2005, Zachary Aaron Coon.

* cited by examiner

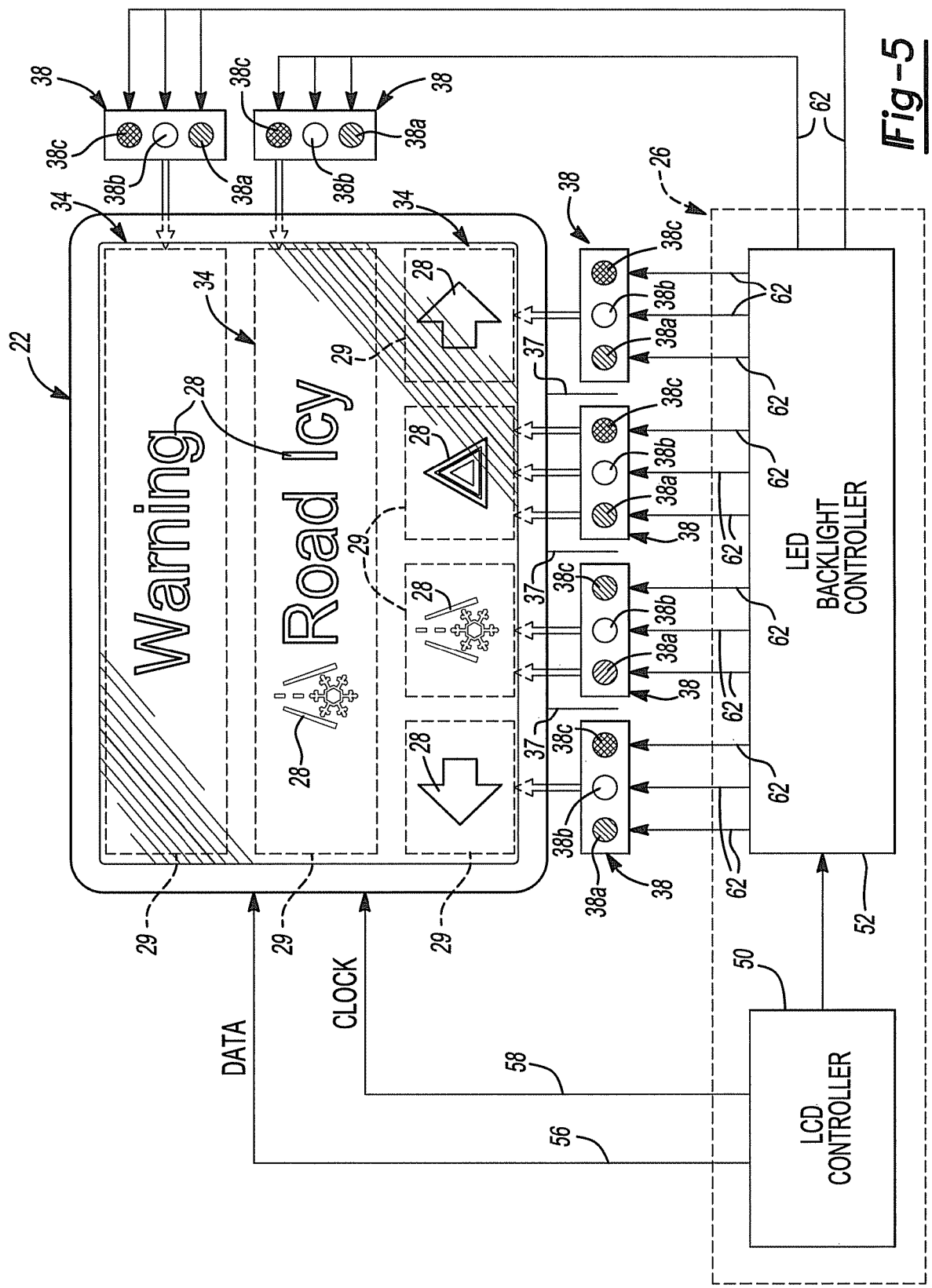

SYSTEM AND METHOD FOR INSTRUMENT PANEL WITH COLOR GRAPHICAL DISPLAY

INTRODUCTION

The present disclosure relates generally to an instrument panel, and more particularly to a system and method for a color graphical display for an instrument panel.

Traditionally, instrument panels are employed in motor vehicles to display information regarding the operation of the motor vehicle to an operator. For example, the instrument panel can include an instrument cluster or a collection of gages that provide information to the operator, such as a fuel level or an engine temperature. In some instances, the instrument panel or instrument cluster can include a message center. The message centers can graphically display a message regarding various operating characteristics of the motor vehicle, such as an illustration of tire pressures at each tire.

Typically, message centers display the graphical message in monochrome color (e.g. black and white) due to the higher cost associated with providing a full color graphical message center. Accordingly, it would be desirable to provide an economical graphical message center for use with an instrument panel that is capable of displaying a graphical message to the operator in one or more colors. A message can be any combination of text, graphics and color. Each component of the message then has a benefit for driver understanding; graphical content to understand the message quickly, text content to explain or provide more detailed information, and color content to show priority. The message may also include a dynamic component such as scrolling or blinking text, moving or animated graphical images, or flashing or changing color.

Provided is a message center that can comprise a liquid crystal display (LCD). The LCD can be divided into one or more zones, with each zone being designated for a specific message. The message center can also include a light guide system positioned behind the liquid crystal display. The light guide system can have one or more light guides, with each of the light guides having a first end, and each of the light guides can be aligned with a zone of the liquid crystal display. The message center can further include a multi-color light emitting diode (LED) that can be mounted at the first end of each of the light guides, and a control system that can set the intensity of each of the multi-colors on each of the LEDs such that a backlighting color and intensity of each zone is individually controlled. A message which is larger than one LCD zone can be displayed by breaking up the image and displaying it on multiple zones and driving the backlight LEDs accordingly. In this way the specific message in a zone may be a component of a larger message being displayed.

A message center is provided. The message center can include a liquid crystal display (LCD), with the LCD being divided into multiple zones such that each zone can be designated for a specific graphical message. The message center can include a light guide system positioned behind the LCD. The light guide system can have multiple light guides separated by completely light-reflective sidewalls. The light guides can have first ends and second ends, and the light guides can narrow toward the second ends. Each of the light guides can be aligned with a zone of the LCD. The message center can also include a multi-color light emitting diode (LED) mounted at the first end of each light guide, and a control means for setting the intensity of each of the multi-colors on each of the LEDs such that a backlighting of each zone is individually controlled.

Further provided is a message center for an instrument panel of a motor vehicle. The instrument panel can comprise one or more gages that display an operating condition associated with the motor vehicle, and a color graphical display coupled to the instrument panel adjacent to the gages. The color graphical display can include a liquid crystal display (LCD). The LCD can be divided into one or more zones, with each zone being designated for a specific message. The color graphical display can also include a light guide system positioned behind the liquid crystal display. The light guide system can have one or more light guides, with each of the light guides aligned with a zone and having a first end. The color graphical display can include a light emitting diode (LED) mounted at the first end of each of the light guides, and a control system that sets the intensity of each of the LEDs such that a backlighting of each zone is individually controlled.

Further areas of applicability of the present teachings will become apparent from the detailed description provided hereinafter. It should be understood that the detailed description and specific examples, while indicating various embodiments of the present teachings, are intended for purposes of illustration only and are not intended to limit the scope of the present teachings.

BRIEF DESCRIPTION OF THE DRAWINGS

The present invention will become more fully understood from the detailed description and the accompanying drawings, wherein:

FIG. 5 is a simplified schematic illustration of the control diagram of FIG. 3.

DETAILED DESCRIPTION OF THE VARIOUS EMBODIMENTS

The following description of various embodiments is merely exemplary in nature and is in no way intended to limit the present teachings. Although the following description is related generally to a color graphical display for use with an instrument panel, it will be understood that the color graphical display, as described and claimed herein, can be used in combination with any appropriate system or device where it is desirable to graphically display information to a user in one or more colors, such as on a message center for a conventional oven. Therefore, it will be understood that the following discussions are not intended to limit the scope of the appended claims.

Figure 1:
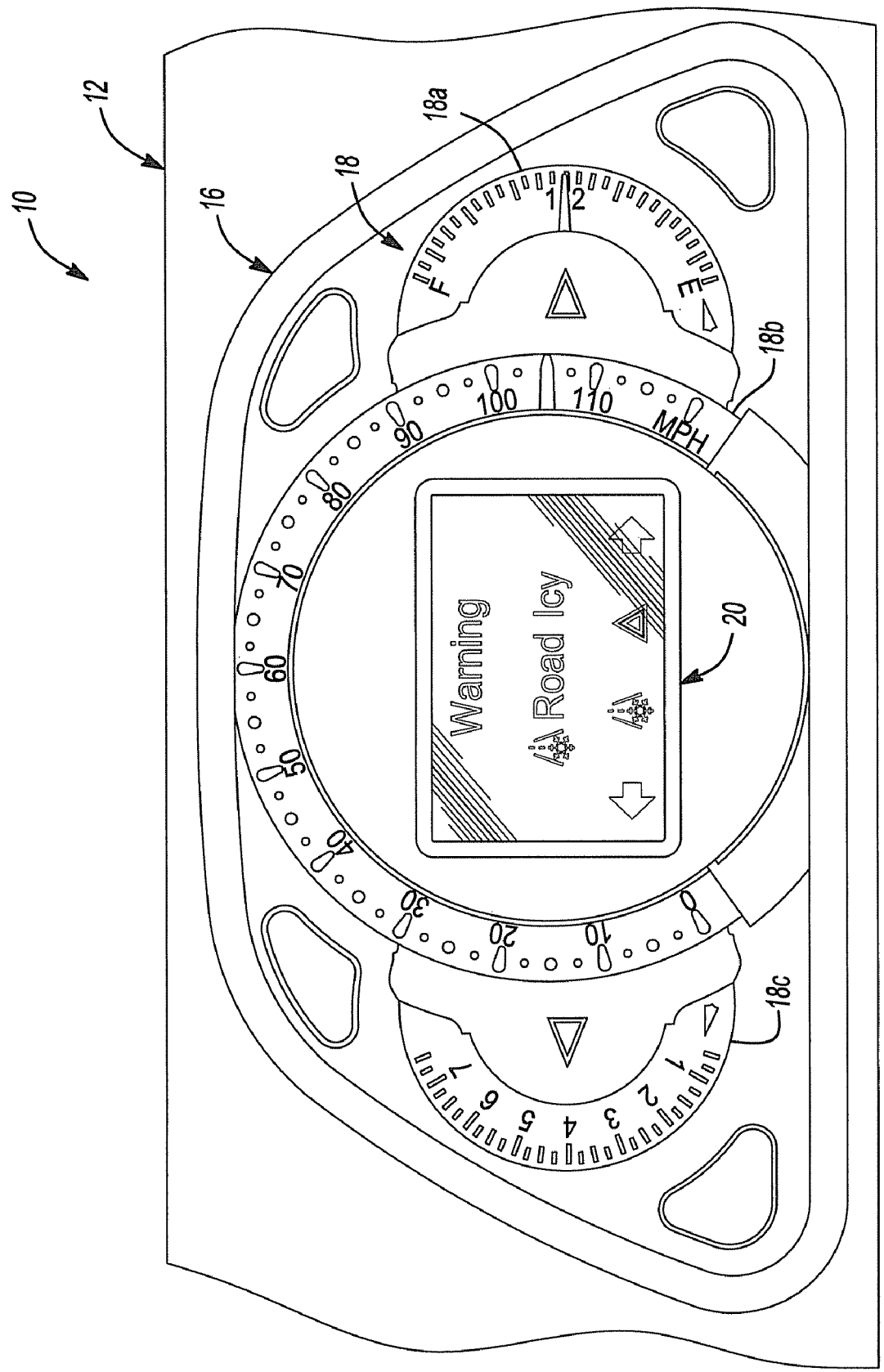
FIG. 1 is an environmental view of an exemplary instrument panel with color graphical display according to various teachings.

With reference to FIG. 1, an exemplary portion of a motor vehicle 10 is shown. The motor vehicle 10 can include an instrument panel 12. The instrument panel 12 can be coupled to the motor vehicle 10 such that the instrument panel 12 is visible within a passenger area (not shown) to provide the operators of the motor vehicle 10 with data regarding the operation of the motor vehicle 10. The instrument panel 12 can include an instrument cluster 16 that displays the data for the operators. The instrument cluster 16 can include one or more gages 18 and a color graphical display 20. The gages 18 can include at least one of a fuel gage 18a, a speedometer 18b and a tachometer 18*c*. The fuel gage 18*a*, the speedometer 18*b* and the tachometer 18*c* can be constructed in any desired manner, and as such, need not be described in significant detail herein. Our exemplary construction is detailed in co-pending U.S. patent application Ser. No. 11/157,013, filed Jun. 20, 2005, issued Mar. 25, 2008 as U.S. Pat. No. 7,347,575, the disclosure of which is hereby incorporated by reference as if fully set forth in detail herein. The display 20 can be coupled to the instrument cluster 16, and can provide the operator of the motor vehicle 10 with real-time data regarding one or more conditions associated with the operation of the motor vehicle 10. Although the display 20 is illustrated as disposed within the speedometer 18*b*, it should be understood that the display 20 could be disposed at any desired location in the instrument panel 12.

Figure 2:
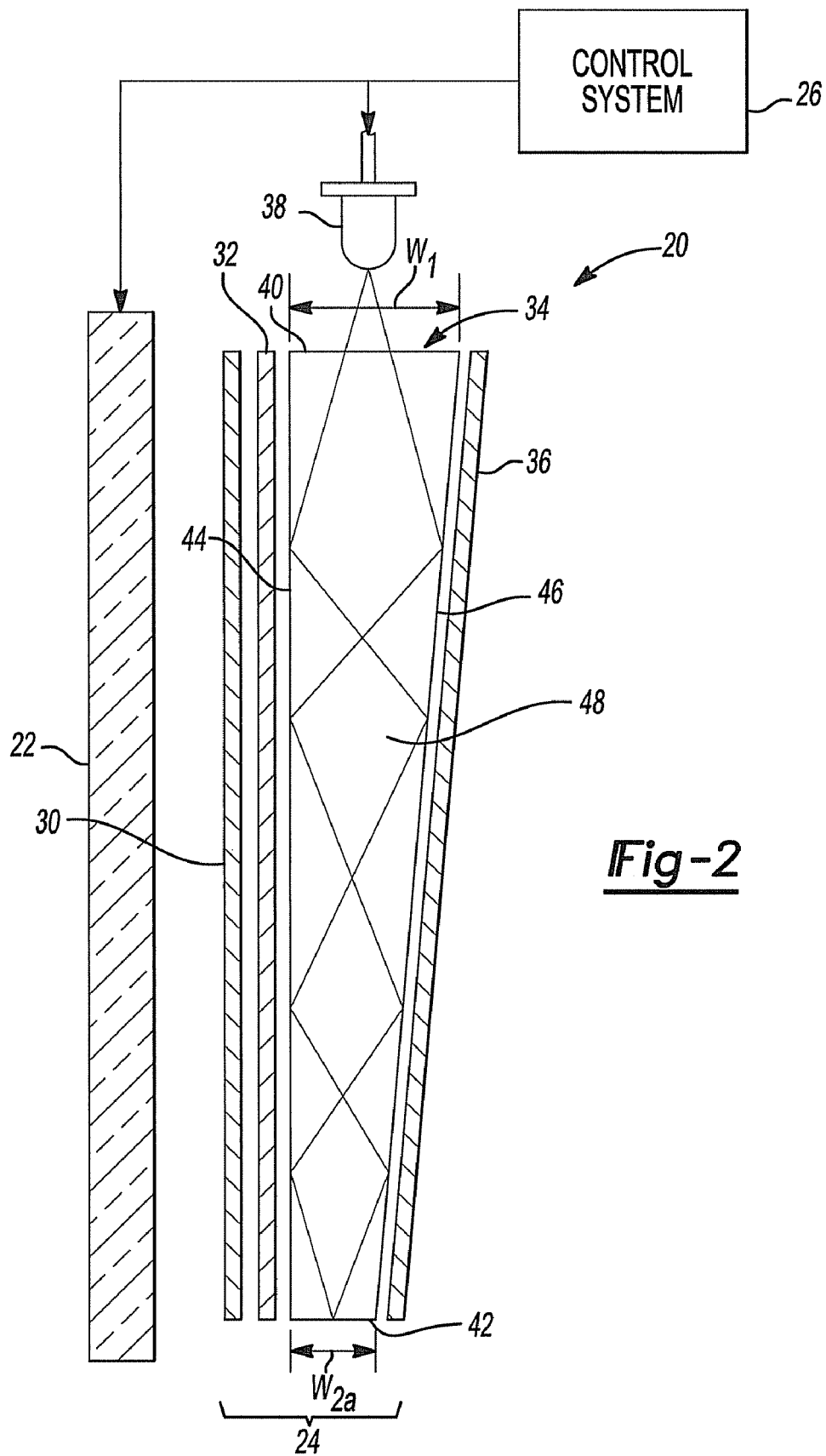
FIG. 2 is a cross-sectional exploded view of the color graphical display of FIG. 1.
Figure 3:
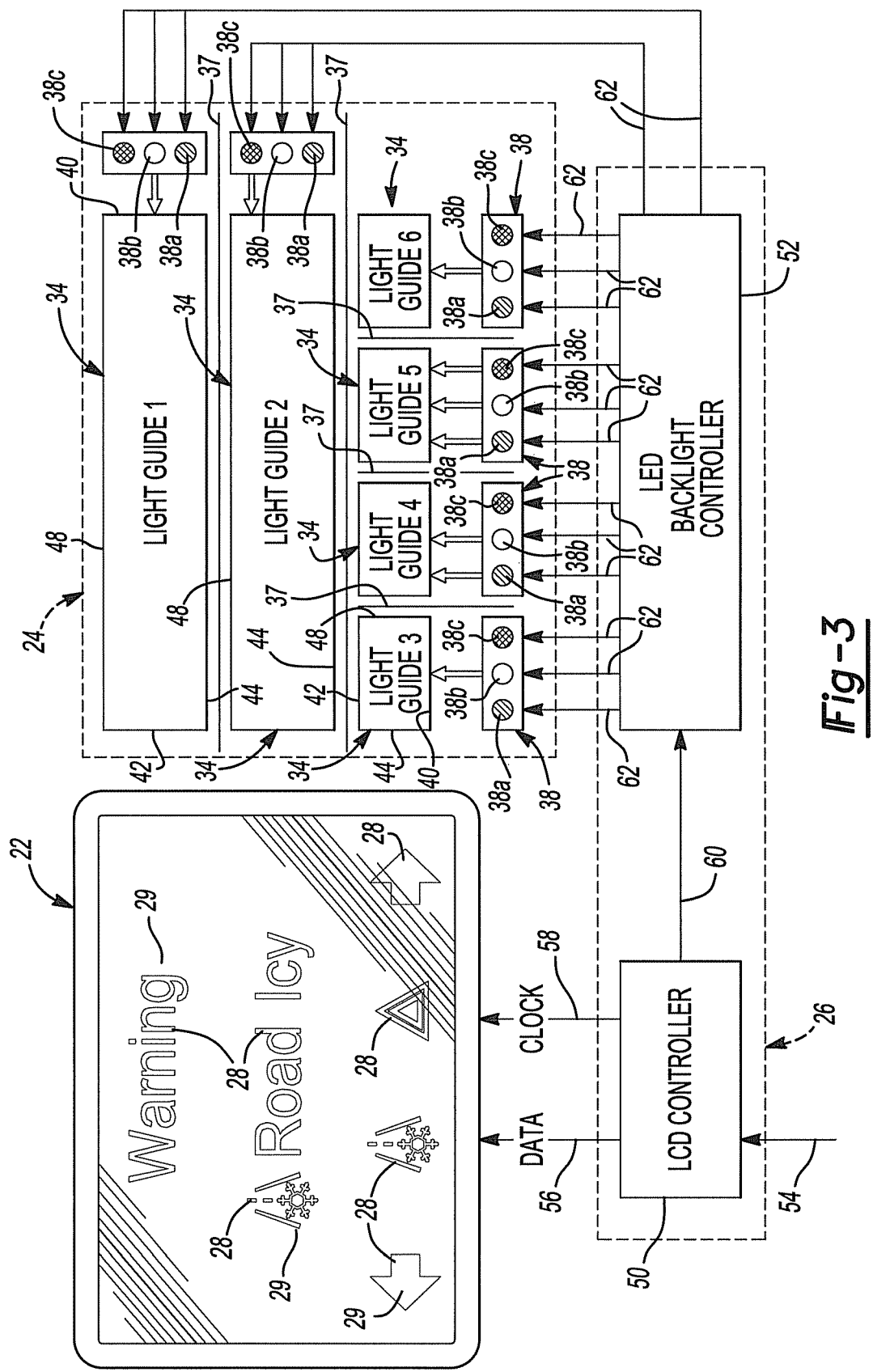
FIG. 3 is a schematic illustration of a control diagram for the color graphical display of FIG. 2.

With reference to FIGS. 2 and 3, the display 20 can include a liquid crystal display (LCD) 22, a light guide system 24 and a control system 26. The LCD 22 can be overlaid or positioned substantially over the light guide system 24 so that the light guide system 24 can serve to backlight the LCD 22. The LCD 22 can be a conventional monochrome LCD, such as an model F-51955GNFHU-T-AEN LCD from Optrex of Plymouth, Mich. and thus, the LCD 22 will not be discussed in great detail herein. Briefly, however, the LCD 22 can be in communication with the control system 26 to receive at least one control signal, as will be discussed herein. Based on the control signal, the LCD 22 can display at least one graphical message 28, such as that which is as shown in FIG. 3. For instance, as shown in FIG. 3, the LCD 22 can be comprised of one or more zones 29 that can each correspond to a respective portion of the light guide system 24 to enable a particular backlighting scheme for each zone 29, as will be discussed. The graphical message 28 displayed on the LCD 22 can be backlit by the light guide system 24. It should be noted that the graphical message 28 can comprise one or more of a text message comprised of any combination of alpha/numeral characters, a graphical image or combinations thereof.

With reference to FIG. 2, the light guide system 24 can include a prism foil 30, a diffuser 32, one or more light guides 34, one or more reflectors 36 and one or more light sources 38. It should be understood that although the components of the light guide system 24 are illustrated as discrete components, one or more of the components in the light guide system 24 could be combined or manufactured together into various subassemblies. With continuing reference to FIG. 2, the prism foil 30 can be adjacent and parallel to the LCD 22 when the display 20 is assembled. The prism foil 30 can disperse the light received from the diffuser 32 to backlight the LCD 22. The diffuser 32 can be comprised of a partially reflective polymeric material to enable the transmission of about 50 percent of the light from the light guides 34 to backlight the LCD 22. By being partially reflective, the diffuser 32 can create a more uniform backlight for the LCD 22 from the light sources 38 in communication with the light guides 34, as will be discussed.

The light guides 34 can comprise a transparent structure that can receive light from the light sources 38 to backlight the LCD 22. The light guides 34 can be composed of any suitable transparent material, such as a polymeric material. One type of suitable polymeric material is an acrylic glass. As will be discussed, the number of light guides 34 can be directly related to the number of light sources 38, and the number of zones 29 in the LCD 22. Thus, for every zone 29 in the LCD 22, there can be a respective number of light guides 34 such that one light guide 34 can be associated with a single zone 29. It should be understood, however, that although multiple light guides 34 are shown, a single light guide 34 could be used to backlight the LCD 22. As shown in FIGS. 2 and 3, the light guides 34 can have a proximal end 40, a distal end 42, a first sidewall 44, a second sidewall 46 and end walls 48.

Figure 4:
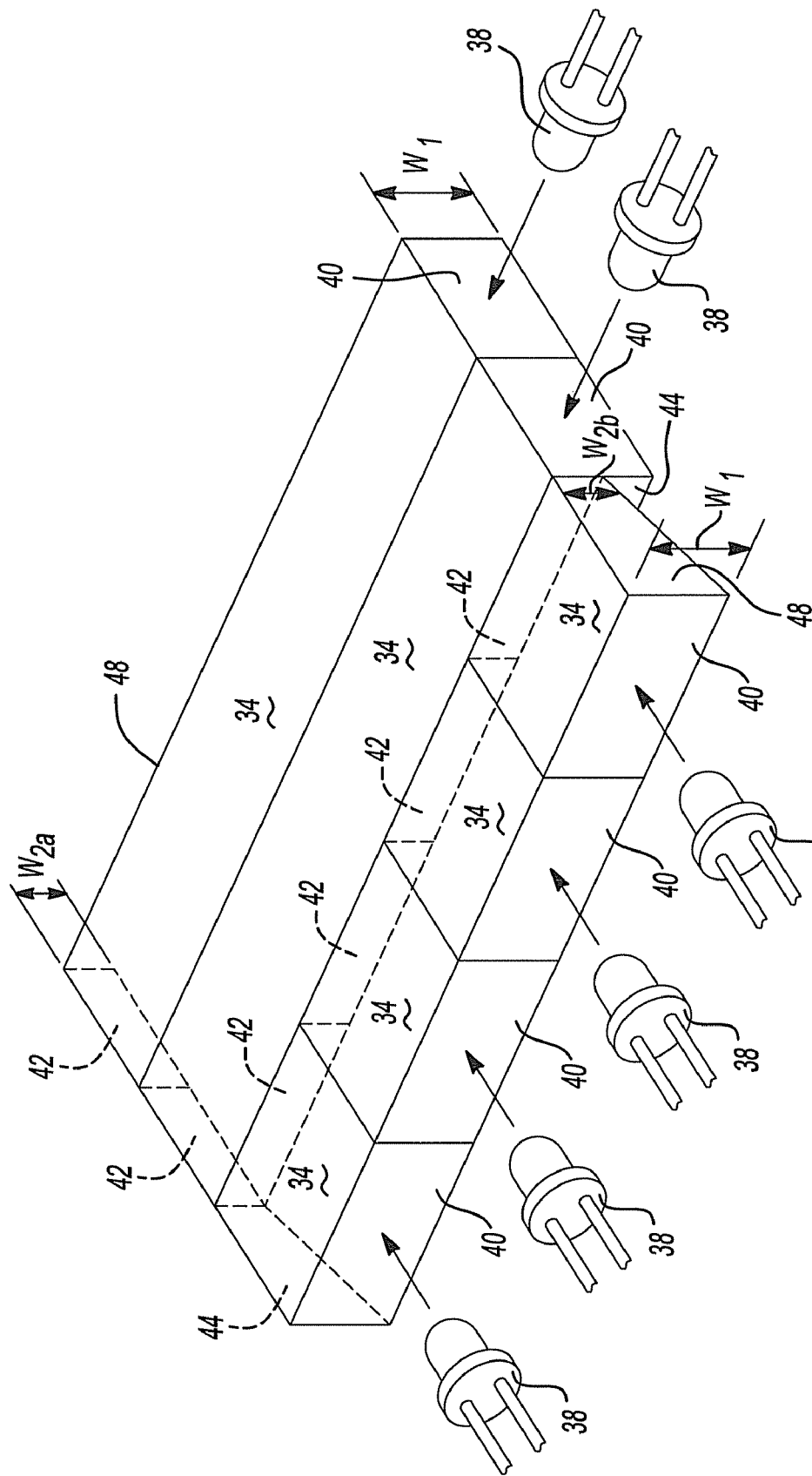
FIG. 4 is a perspective view of an exemplary light guide for use with the color graphical display of FIG. 1.

The proximal end 40 can be adjacent to the light sources 38, and the distal end 42 can be opposite the proximal end 40. It should be noted that the proximal end 40 is characterized by its proximity to the light source 38, and thus, depending upon the particular location of the light source 38 with respect to the particular light guide 34, the proximal end 40 of adjoining light guides 34 could be disposed on different sides or ends of the LCD 22. The distal end 42 can be coupled to the proximal end 40 via the first sidewall 44 and the second sidewall 46. A width $W_1$ of the proximal end 40 can be about equal to a width $W_{2a}$ of the distal end 42, as shown in FIG. 4, or the width $W_1$ can be greater than the width $W_{2b}$ of the distal end 42, as also shown FIG. 4. If the width of the proximal end 40 is about equal to the width of the distal end 42, then the propagation of light from the light source 38 in the light guide 34 may be less uniform than if the width of the proximal end 40 is greater than the width of the distal end 42.

Depending upon the width of the proximal and distal ends 40 and 42, the first sidewall 44 and the second sidewall 46 can either be parallel to each other or can be angled away from each other, and can connect the proximal end 40 to the distal end 42. The first sidewall 44 can be adjacent to the diffuser 32 when the light guide system 24 is assembled, while the second sidewall 46 can be adjacent to the reflector 36 when the light guide system 24 is assembled. The end walls 48 can be coupled to the proximal end 40, distal end 42, first sidewall 44 and second sidewall 46 to enclose the light guides 34.

The reflector 36 can comprise a completely reflective material, such as a mirror, that enables substantially complete reflection of light from the light source 38. The reflector 36 can be adjacent to the second sidewall 46 when the light guide system 24 is assembled to enable the reflection of the light that exits the second sidewall 46. Due to the location of the reflector 36, the reflector 36 can direct the light that exits the second sidewall 46 towards the first sidewall 44, such to enable the light to exit the light guide 34. In addition, as best shown in FIG. 3, a barrier reflector 37 can be disposed between adjacent light guides 34 to ensure that the zone 29 of the LCD 22 that corresponds to the light guide 34 receives light from just that light guide 34.

With reference to FIGS. 3 and 5, the light sources 38 can comprise any light emitting device, such as a light emitting diode (LED). Generally, the light sources 38 can comprise a red-green-blue (RGB) LED. If the light source 38 comprises a RGB LED, each light source 38 can include a red LED 38*a*, a green LED 38*b* and a blue LED 38*c* that can be responsive to the control system 26 to output colored visual light at a particular intensity. Thus, the overall output of the light source 38 can comprise a single color that can be formed from a known combination of the output from the red LED 38*a*, the green LED 38*b* and the blue LED 38*c*. The light sources 38 can be positioned adjacent to the proximal end 40 of the light guides 34 to direct the colored light into the light guide 34. As discussed, the number of light sources 38 can be equal to the number of zones 29 in the light guide system 24, such that each zone 29 can have one light source 38. The light sources 38 can be responsive to one or more signals from the control system 26 to output light in a desired color.

With continued reference to FIG. 5, the control system 26 can be in communication with both the LCD 22 and the light guide system 24. The control system 26 can include an LCD controller 50 and a LED Backlight Controller 52. As used herein, the term controller refers to an application specific integrated circuit (ASIC), an electronic circuit, a processor (shared, dedicated, or group) and memory that execute one or more software or firmware programs, a combinational logic circuit, or other suitable components that provide the described functionality. The LCD controller 50 can be any suitable controller, such as a field-programmable gate array. The LCD controller 50 can receive as input a signal 54 indicative of one or more operating conditions associated with the motor vehicle 10. Based on the signal 54, the LCD controller 50 can set a data signal 56 and a clock signal 58 for the LCD 22, and can also set a lighting signal 60 for the LED Backlight Controller 52.

The data signal 56 can comprise the graphical message 28 for display on the LCD 22, along with the desired zone 29 in which to display the graphical message 28. The clock signal 58 can comprise a signal to move the graphical message 28 on the LCD 22. In this regard, the clock signal 58 can comprise a length of time to display the graphical message 28, but can also comprise a signal to move the graphical message 28 so that the graphical message 28 can scroll on the LCD 22, or a signal to display the graphical message 28 on the display at specified intervals, such that the graphical message 28 "blinks" or "flashes" on the LCD 22. The graphical messages 28 can comprise any combination of text, graphics (e.g. icons) and color thereby improving the driver response to vehicle information. Graphical messages 28 that are larger in size than a single zone 29 can be displayed by displaying parts of the graphical message 28 on adjacent zones 29. Also, if there is no graphic to be displayed in a given zone 29, the backlight could be turned off in that zone 29 to give a black zone 29 with high contrast to adjacent illuminated zones 29.

The lighting signal 60 can comprise a lighting scheme for the light guide system 24. In this regard, the lighting signal 60 can comprise a desired color for each zone 29 on the LCD 22 and an amplitude or intensity of the light output. In addition, if desirable, the lighting signal 60 can comprise a desired output format for the light, such as "blinking" or "flashing." The lighting signal 60 can be received as input by the LED Backlight Controller 52. The LED Backlight Controller 52 can comprise any type of controller that can operate the light source 38 in response to the lighting signal. Based on the lighting signal 60, the LED Backlight Controller 52 can set current 62 for the light sources 28. The LED backlight Controller 52 may also generate a pulse width modulated (PWM) signal to control the brightness of the LEDs. The current 62 can be sent to one or more of the red LED 38a, green LED 38b or blue LED 38c to enable the light source 38 to output the desired color for the zone 29 of the LED 22. For example, the light guide controller 52 can output current 62 to only the green LED 38b of the light source 38, such that the light source 38 outputs the color "green" to the light guide 34 so that the zone 29 can be illuminated in "green." The LED Backlight Controller 52 can also output current 62 to the red LED 38a and the green LED 38b so that the light source 38 outputs the color "yellow" to the light guide 34, and thus, the zone 29 of the LCD 22 can be illuminated "yellow." Therefore, the LED Backlight Controller 52 can supply current 62 to one or more of the red LED 38a, green LED 38b or blue LED 38c to generate any one of the many possible colors within the color gamut determined by the LEDs.

Thus, the display 20 can provide the operator of the motor vehicle 10 with one or more graphical messages 28 that can each be illuminated by the light guide system 24 in one of the many possible colors within the color gamut determined by the LEDs. Therefore, the display 20 can provide an economical alternative to a color LCD display by backlighting a monocolor LCD 22. In addition, since the control system 26 generally illuminates only the zones 29 in which a graphical message 28 is displayed, no current is supplied to the inactive regions, which can improve the display black level, save power, and decrease heat associated with having current 62 applied to all of the light sources 38. The light output of the display 20 can also be increased or decreased based on the operating conditions of the motor vehicle 10 (i.e. day or night node, ambient light incident on the display, backlight component temperature, or could be controlled by a user input device (not shown), such as a scrolling wheel or knob, for example.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

For example, while the display 20 has been described as including an LCD 22 that enables the display of data to the operator of the motor vehicle 10, those of skill in the art will appreciate that the present disclosure, in its broadest aspects, may be constructed somewhat differently. For example, graphical messages 28 could be formed on a template that is overlaid onto the light guide system 24, and the light guide system 24 could be used to illuminate the graphical messages 28 in various colors depending upon the status of the graphical message 28. For instance, the graphical message overlay could include an illustration of the fuel tank, and the light guide system 24 can be used to illuminate the fuel tank illustration in various colors representing the level of fuel in the fuel tank i.e. "green" for full, "yellow" for one-quarter of the way full and "red" for almost empty.

What is claimed is:

1. A message center comprising:
   a liquid crystal display (LCD), the LCD being divided into one or more zones, each zone being designated for a specific message;
   a light guide system positioned behind the liquid crystal display, the light guide system having one or more light guides, with each of the light guides having a first end, each of the light guides aligned with a zone of the liquid crystal display;
   a multi-color light emitting diode (LED) mounted at the first end of each of the light guides, each multi-color LED being configured to selectively emit a plurality of light colors; and
   a control system that sets the intensity of each of the multi colors on plurality of light colors emitted from each of the LEDs such that a backlighting of each zone is individually controlled;
   wherein each of the light guides has a second end, with each of the light guides narrowing toward the second ends.

2. The message center of claim 1, wherein the control system sets the intensity of each of the plurality of light colors emitted from each of the LEDs such that each zone on the LCD has a distinct color.

3. The message center of claim 1, wherein each of the light guides has a second end, with the second ends parallel to the first ends.

4. The message center of claim 1, wherein the light guide system further comprises:
   a prism foil disposed between the LCD and the light guide to dispense the light generated by the LEDs; and
   a diffuser disposed between the prism foil and the light guide.

5. The message center of claim 4, wherein the light guide system further comprises:
   one or more reflectors disposed adjacent to each of the light guides opposite the diffuser to reflect the light from the LEDs to the diffuser.

6. The message center of claim 5, wherein one or more reflectors are disposed between each light guide such that the light generated by the LED associated with each light guide is contained within the light guide.

7. The message center of claim 1, wherein the message center is adapted to be coupled to an instrument panel.

8. The message center of claim 1, wherein the LCD is a monochrome LCD.

9. The message center of claim 1, wherein the LED is a red-green-blue LED.

10. A message center comprising:
    a liquid crystal display (LCD), the LCD being divided into multiple zones, each zone being designated for a specific graphical message;
    a light guide system positioned behind the LCD, the light guide system having multiple light guides separated by completely light-reflective sidewalls, the light guides having first ends and second ends with the light guides narrowing toward the second ends, each of the light guides aligned with a zone of the LCD;
    a multi-color light emitting diode (LED) mounted at the first end of each light guide, the multi-color LED being configured to selectively emit a plurality of light colors; and
    a controller that is configured for setting the intensity of each of the plurality of light colors emitted from each of the LEDs such that a backlighting of each zone is individually controlled.

11. The message center of claim 10, wherein the controller sets the intensity of each of the plurality of light colors emitted from each of the LEDs such that each zone on the LCD has a distinct color.

12. The message center of claim 10, wherein the light guide system further comprises:
    a prism foil disposed between the LCD and the light guide to dispense the light generated by the LEDs; and
    a diffuser disposed between the prism foil and the light guide.

13. The message center of claim 12, wherein the light guide system further comprises:
    one or more reflectors disposed adjacent to each of the light guides opposite the diffuser to reflect the light from the LEDs to the diffuser.

14. The message center of claim 13, wherein one or more reflectors are disposed between each light guide such that the light generated by the LED associated with each light guide is contained within the light guide.

15. The message center of claim 10, wherein the LCD is a monochrome LCD.

16. A message center for an instrument panel of a motor vehicle, the instrument panel comprising:
    one or more gages that display an operating condition associated with the motor vehicle; and
    a color graphical display coupled to the instrument panel adjacent to the gages, the color graphical display including:
    a liquid crystal display (LCD), the LCD being divided into one or more zones, each zone being designated for a specific message;
    a light guide system positioned behind the liquid crystal display, the light guide system having one or more light guides, with each of the light guides aligned with a zone, the light guides having a first end;
    a light emitting diode (LED) mounted at the first end of each of the light guides; and
    a control system that sets the intensity of each of the light emitting diodes such that a backlighting of each zone is individually controlled;
    wherein each of the light guides has a second end, with each of the light guides narrowing toward the second ends.

17. The message center of claim 16, wherein the LEDs comprise a multi-color LED.

18. The message center of claim 16, wherein one or more reflectors are disposed between each light guide and behind each light guide such that the light generated by the LED associated with each light guide is contained within the light guide.

* * * * *